(12) United States Patent
Rizk

(10) Patent No.: US 12,002,082 B2
(45) Date of Patent: Jun. 4, 2024

(54) METHOD, MEDIUM, AND SYSTEM FOR PROVIDING TRAIT-FOCUSED RECOMMENDATIONS OF COMPUTER APPLICATIONS

(71) Applicant: SHOPIFY INC., Ottawa (CA)

(72) Inventor: Paul Rizk, Toronto (CA)

(73) Assignee: SHOPIFY, INC., Ottawa (CA)

( * ) Notice: Subject to any disclaimer, the term of this patent is extended or adjusted under 35 U.S.C. 154(b) by 490 days.

(21) Appl. No.: 17/476,363

(22) Filed: Sep. 15, 2021

(65) Prior Publication Data

US 2023/0080396 A1   Mar. 16, 2023

(51) Int. Cl.
   *G06Q 30/00* (2023.01)
   *G06F 16/9535* (2019.01)
   *G06Q 30/0601* (2023.01)

(52) U.S. Cl.
   CPC ..... *G06Q 30/0631* (2013.01); *G06F 16/9535* (2019.01); *G06Q 30/0641* (2013.01)

(58) Field of Classification Search
   CPC ........... G06Q 30/0631; G06Q 30/9535; G06Q 30/0641
   See application file for complete search history.

(56) References Cited

U.S. PATENT DOCUMENTS

| | | | | |
|---|---|---|---|---|
| 9,594,758 | B2 * | 3/2017 | Bararsani | G06F 16/435 |
| 9,721,019 | B2 * | 8/2017 | Kyaw | G06F 16/23 |
| 11,004,135 | B1 * | 5/2021 | Sandler | G06Q 30/0631 |
| 11,151,450 | B2 * | 10/2021 | Zoldi | G06N 5/045 |
| 11,551,281 | B2 * | 1/2023 | Berl | G06N 20/00 |
| 11,748,798 | B1 * | 9/2023 | Agarwal | G06Q 30/0633 705/26.7 |
| 2009/0006373 | A1 * | 1/2009 | Chakrabarti | G06F 16/335 707/999.005 |
| 2015/0025996 | A1 * | 1/2015 | Fishman | G06Q 30/0641 705/26.7 |
| 2018/0365556 | A1 * | 12/2018 | Guttmann | G06F 7/14 |
| 2019/0163829 | A1 * | 5/2019 | Puri | G06Q 30/02 |
| 2020/0151516 | A1 * | 5/2020 | Anushiravani | A61B 5/4803 |
| 2021/0201146 | A1 * | 7/2021 | Yoon | G06N 5/046 |
| 2021/0334671 | A1 * | 10/2021 | Minsky | G06N 3/045 |

OTHER PUBLICATIONS

Marchand, Andre, and Paul Marx. "Automated product recommendations with preference-based explanations." Journal of retailing 96.3 (2020): 328-343. (Year: 2020).*

* cited by examiner

*Primary Examiner* — Matthew E Zimmerman

(57) ABSTRACT

Systems, methods and computer readable medium are provided for receiving a first set of recommendations of computer applications from a recommendations engine having an input layer, at least one hidden layer and an output layer, the recommendations generated based on a set of input features characterizing an entity; identifying a commonality among at least some recommendations for defining a priority trait for the entity; associating the priority trait with at least one priority feature from the set of input features; generating a modification for modifying at least one of: the set of input features provided as input to the recommendations engine to emphasize those features associated with the priority feature, or at least one weight of the hidden layer in the recommendations engine to bias selection of the priority feature; providing the modification to the recommendations engine to generate a second set of recommendations for display on a computing device.

20 Claims, 7 Drawing Sheets

FIG. 2

METHOD, MEDIUM, AND SYSTEM FOR PROVIDING TRAIT-FOCUSED RECOMMENDATIONS OF COMPUTER APPLICATIONS

FIELD

The present application relates to systems and methods for the generation of recommendations of computer applications of relevance and more specifically, to methods for dynamically predicting interests of entities based on traits of prior recommendations.

BACKGROUND

Recommendations of computer applications (e.g. online videos, e-commerce apps, other applications from an app store etc.) of relevance to users or entities online are best made when they are tailored to the target individual or entity. Whether or not an individual is receptive to a given recommendation will largely depend on that individual's personality traits, characteristics and/or preferences. For example, after watching and highly rating a superhero movie on a streaming platform, the viewer may be interested in receiving recommendations for other superhero movies to download onto the device. However, an individual interacting with one or more computing devices (e.g. a smartphone and virtual assistants) is unlikely to have a singular preference, and in cases where individuals have multiple preferences that give rise to different sets of recommendations, determining which recommendations are best suited for those individuals can be a challenge. For example, the viewer of the superhero movie may also prefer it because it has a lead female star and is in 3D and thus only considering the fact that the viewer enjoys superhero movies leads to inaccurate and/or superfluous results.

In some recommender models, hard filters may be applied to the generated recommendations to further customize them. For example, in the example above, recommendations generated may be filtered using a super hero tag to narrow recommendations only to those items. However, this is inefficient on multiple fronts. First, the initial recommendation may have missed certain items altogether as the model was not aware of the user's preferences for superhero movies and therefore applying a filter after the recommendation only narrows the current recommendations but doesn't update the model altogether to generate new recommendations which may have been initially missed. Additionally, in some cases, if the recommendations are inaccurate, a user is unlikely to engage with the recommendations and will distrust subsequent applications suggested for download.

That is, one additional problem with current recommendation methods, including collaborative and content based filtering methods is that they do not reflect current preferences of users and rather rely on user ratings and feedback to customize output.

There is thus a need to dynamically generate a set of recommended applications on a computer device that address at least some of the shortcomings mentioned herein.

It would be advantageous to improve the speed, accuracy, and relevance of computer application recommendations for entities in a dynamic manner.

SUMMARY

In some embodiments, a computer-implemented method, system and computer readable medium is disclosed for recommending items to users which are dynamically tailored to an online user's characteristics and preferences yielding more accurate recommendations.

In accordance with exemplary and non-limiting embodiments, there is provided a computer-implemented method for dynamically generating recommendations of computer applications, the method comprising: receiving a first set of recommendations of potential computer applications of interest from a recommendations engine having an input layer, at least one hidden layer and an output layer, the first set of recommendations generated based on a set of input features characterizing an entity provided to the recommendations engine; identifying a commonality among at least some recommendations of the first set of recommendations, the commonality defining a priority trait for the entity; associating the priority trait with at least one priority feature from the set of input features; generating a modification, the modification modifying at least one of: the set of input features provided as input to the recommendations engine to emphasize those features associated with the priority feature, or at least one weight of the hidden layer in the recommendations engine to bias selection of the priority feature; providing the modification to the recommendations engine to generate a second set of recommendations of potential computer applications of interest; and, transmitting the second set of recommendations to a computing device for the entity for presentation thereon.

In at least some aspects, the modification modifies the set of input features provided as input to the recommendations engine to emphasize those features associated with the priority feature, and wherein the priority feature being emphasized comprises weighting each priority feature more heavily than other features in the set of input features as input to the recommendations engine so as to bias the recommendations engine towards the priority feature.

In at least some aspects, the priority feature being emphasized further comprises: applying a scalar multiple to the priority feature to at least double a weighting of that feature as compared to the other features.

In at least some aspects, the modification modifies at least one weight of the hidden layer in the recommendations engine to bias selection of the priority feature, and wherein modifying at least one weight of the hidden layer comprises: modifying weights in a first hidden layer at each node receiving the priority feature to bias selecting the priority feature over the other input features.

In at least some aspects, the at least some recommendations amongst which the commonality is identified comprise recommendations associated with a higher degree of certainty than other recommendations of the first set of recommendations.

In at least some aspects, determining the commonality comprises clustering the first set of recommendations to automatically group together data points with similar characteristics and assigning each said group to categories of recommendations.

In at least some aspects, associating the priority trait with the at least one priority feature from the set of input features comprises analyzing the set of input features to identify features that highly contribute to particular recommendations provided by the recommendations engine and associated with the commonality.

In at least some aspects, presenting the second set of recommendations comprises associating the second set of recommendations with the priority trait common to the at least some recommendations of the first set of recommendations; and transmitting the second set of recommendations comprises providing an instruction to the computing device for the entity to display a reasoning for the second set of recommendations based on associating.

In at least some aspects, wherein the recommendations engine employs a machine learning model.

In at least some aspects, presenting the second set of recommendations comprises automatically downloading the computer applications associated with the second set of recommendations onto the computing device for the entity for subsequent execution upon selection.

In at least some aspects, the method further comprises: iteratively instructing re-running the recommendations engine two or more times to generate another set of recommended applications, each of the iterations emphasizing at least one other commonality and a respective set of commonality combinations identified in the first set of recommendations and a corresponding set of input features to the recommendations engine on a prior execution of the recommendations engine.

In accordance with exemplary and non-limiting embodiments, there is provided a computer readable medium having instructions tangibly stored thereon, wherein the instructions, when executed cause a system to: receive a first set of recommendations of potential computer applications of interest from a recommendations engine having an input layer, at least one hidden layer and an output layer, the first set of recommendations generated based on a set of input features characterizing an entity provided to the recommendations engine; identify a commonality among at least some recommendations of the first set of recommendations, the commonality defining a priority trait for the entity; associate the priority trait with at least one priority feature from the set of input features; generate a modification, the modification modifying at least one of: the set of input features provided as input to the recommendations engine to emphasize those features associated with the priority feature, or at least one weight of the hidden layer in the recommendations engine to bias selection of the priority feature; provide the modification to the recommendations engine to generate a second set of recommendations of potential computer applications of interest; and, transmit the second set of recommendations to a computing device for the entity for presentation thereon.

In accordance with exemplary and non-limiting embodiments, there is provided a computer system for dynamically generating recommendations of computer applications, the computer system comprising: a processor in communication with a storage, the processor configured to execute instructions stored on the storage to cause the system to: receive a first set of recommendations of potential computer applications of interest from a recommendations engine having an input layer, at least one hidden layer and an output layer, the first set of recommendations generated based on a set of input features characterizing an entity provided to the recommendations engine; identify a commonality among at least some recommendations of the first set of recommendations, the commonality defining a priority trait for the entity; associate the priority trait with at least one priority feature from the set of input features; generate a modification, the modification to modify at least one of: the set of input features provided as input to the recommendations engine to emphasize those features associated with the priority feature, or at least one weight of the hidden layer in the recommendations engine to bias selection of the priority feature; provide the modification to the recommendations engine to generate a second set of recommendations of potential computer applications of interest; and, transmit the second set of recommendations to a computing device for the entity for presentation thereon.

BRIEF DESCRIPTION OF THE DRAWINGS

Embodiments will be described, by way of example only, with reference to the accompanying figures wherein:

FIG. 2 is an example of a home page of an administrator, according to one embodiment;

DETAILED DESCRIPTION

One or more currently preferred embodiments have been described by way of example. It will be apparent to persons skilled in the art that a number of variations and modifications can be made without departing from the scope of the invention as defined in the claims.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

In at least some embodiments, it would be advantageous to reduce the processing time and save computing resources associated with inefficient and inaccurate determination of recommended software applications or resources which may be based on outdated manual preferences, require user feedback/rating to customize and/or are only able to focus on a single dimension of preferences.

In at least some embodiments, there is disclosed herein a recommender model that automatically prioritizes an individual's traits (e.g. online characteristics and preferences) and makes recommendations (e.g. downloads computer application(s) based on the top recommendations) based on the priorities defined in the traits would help refine the set of recommendations that the individual is likely to find most useful.

Generally, the present disclosure provides a computer method and system that automatically prioritizes the characteristics and preferences of an entity based on prior recommendations and generates personalized recommendations for that entity by emphasizing or selecting input features provided to a neural network model such as a convolutional neural network associated with those priorities and re-running the model to provide an optimized set of recommendations.

An Example e-Commerce Platform

Figure 1:
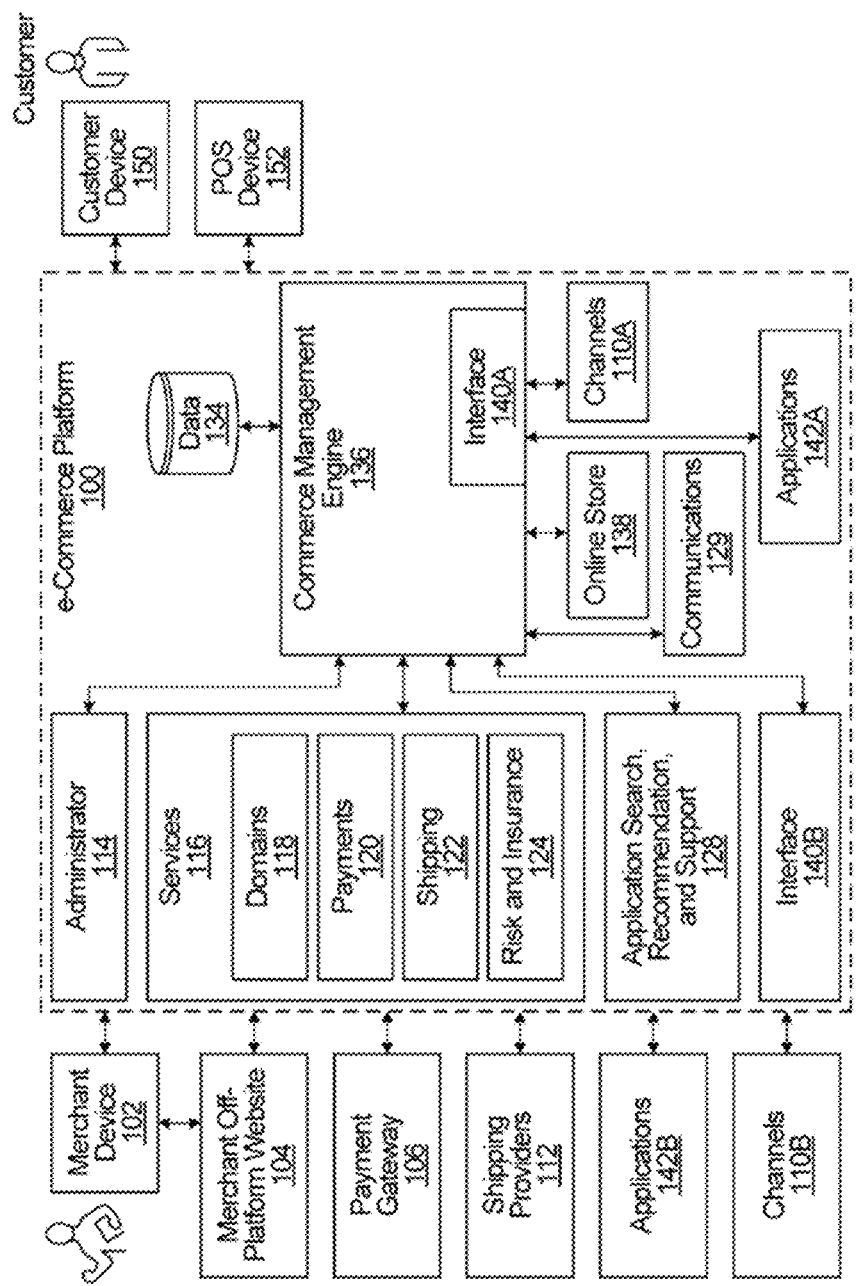
FIG. 1 is a block diagram of an e-commerce platform, according to one embodiment.

FIG. 1 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 1, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 2:
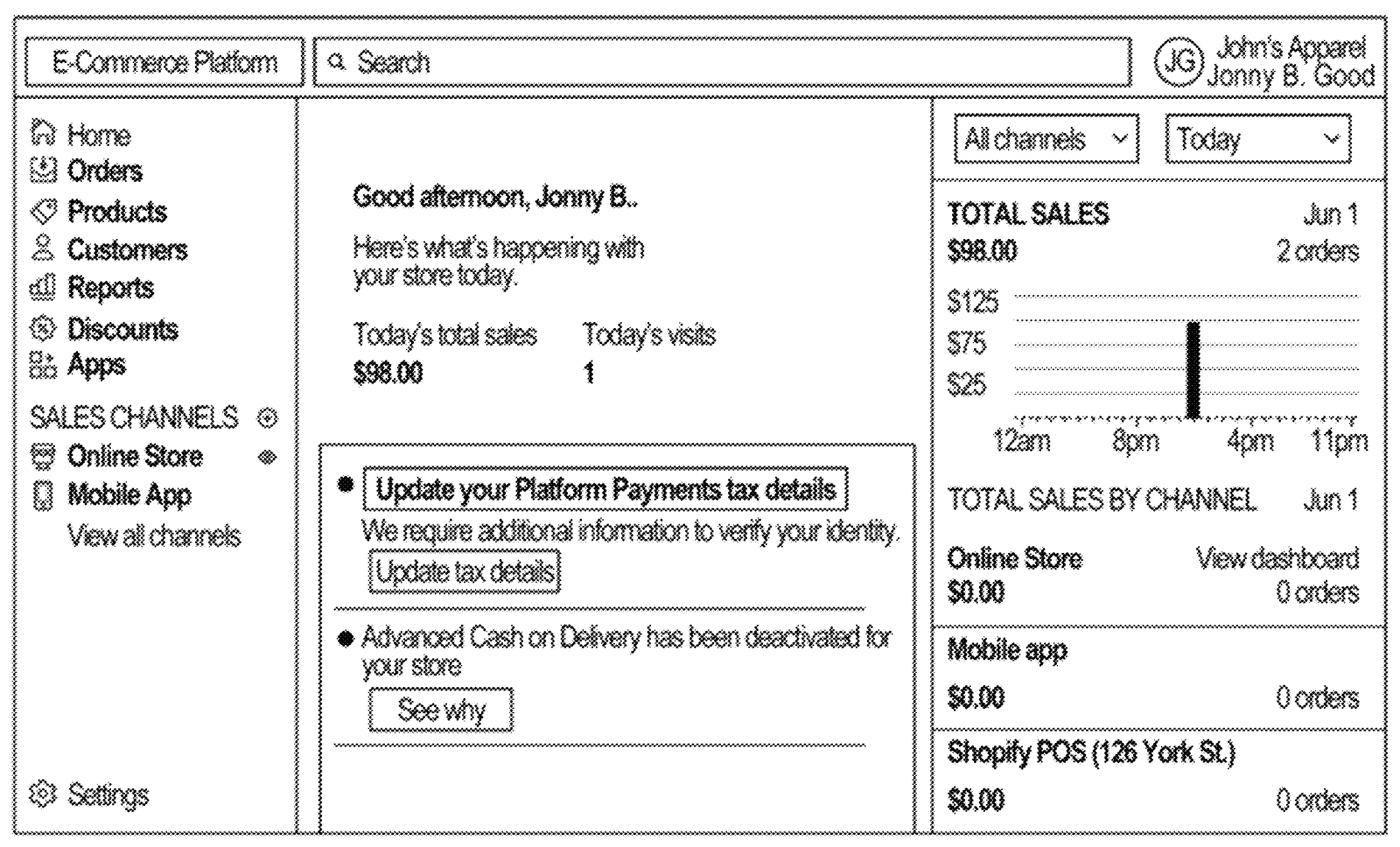

FIG. 2 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 2. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 1, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Engine 300—Trait Focused Recommendations

Figure 3:
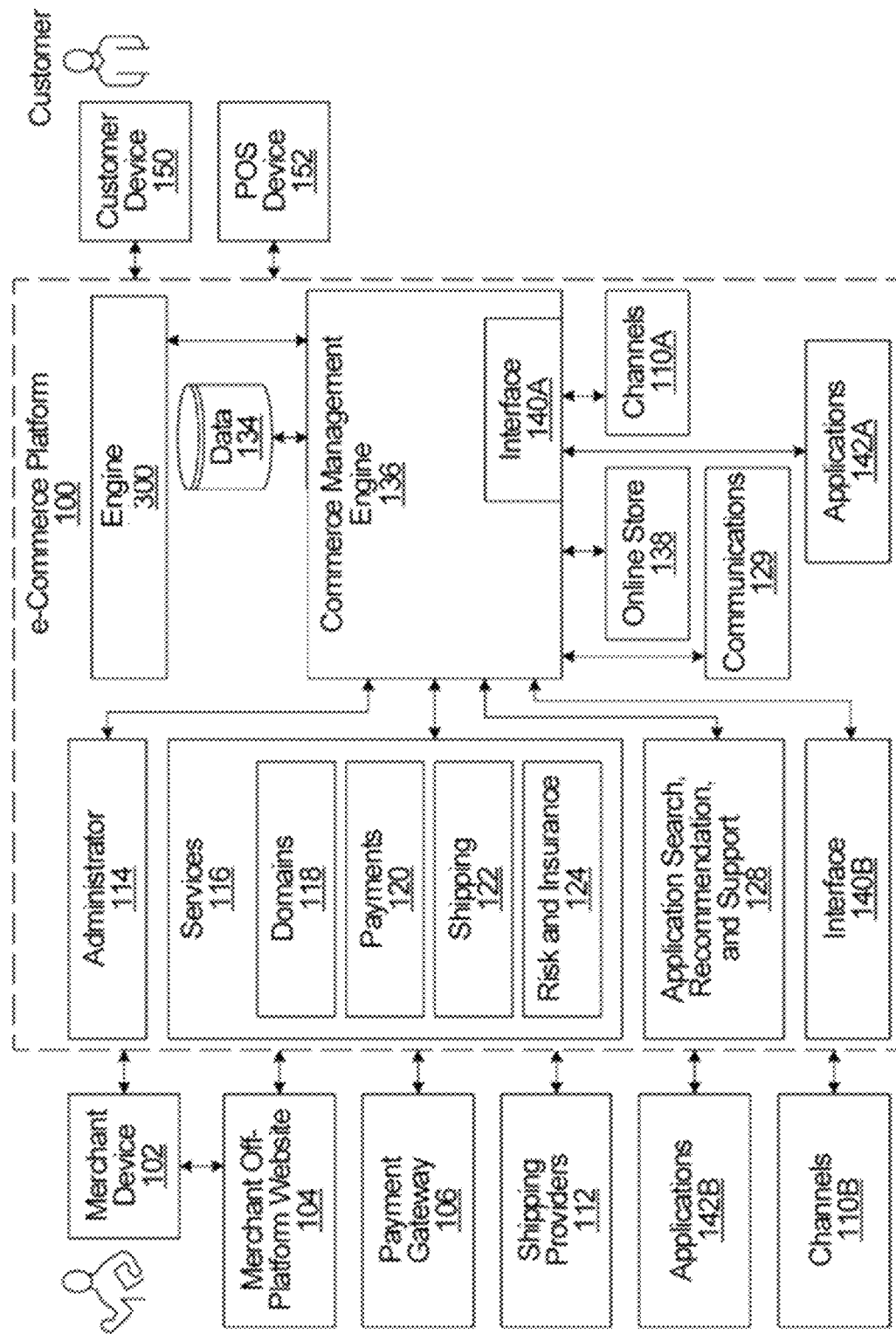
FIG. 3 illustrates the e-commerce platform of FIG. 1 but including an engine for generating recommendations of computer applications to an entity, according to one embodiment.

The functionality described herein may be used in e-commerce systems to provide improved customer or buyer experiences. The e-commerce platform 100 could implement the functionality for any of a variety of different applications, examples of which are described elsewhere herein. FIG. 3 illustrates the e-commerce platform 100 of FIG. 1 but including an engine 300. The engine 300 is an example of a computer-implemented recommendation system and engine that implements the functionality described herein for use by the e-commerce platform 100, the customer device 150 and/or the merchant device 102.

The engine 300, also referred to as a recommendations engine, may generate a list of recommendations of computer related items and resources, including computer applications that are predicted to be of interest to an entity or individual(s) interacting via one or more computing devices (e.g. merchant device 102 and/or customer device 150 and/or other native or browser application in communication with the platform 100) with the engine 300. In non-limiting examples, the recommendations may be in the form of a link for download of a recommended application. This link may be to an application store database, a website, to connect to an external device, to another native application on the computing device for the entity, or a link to execute the recommendation directly on the computing device of the entity, etc.

Figure 4:
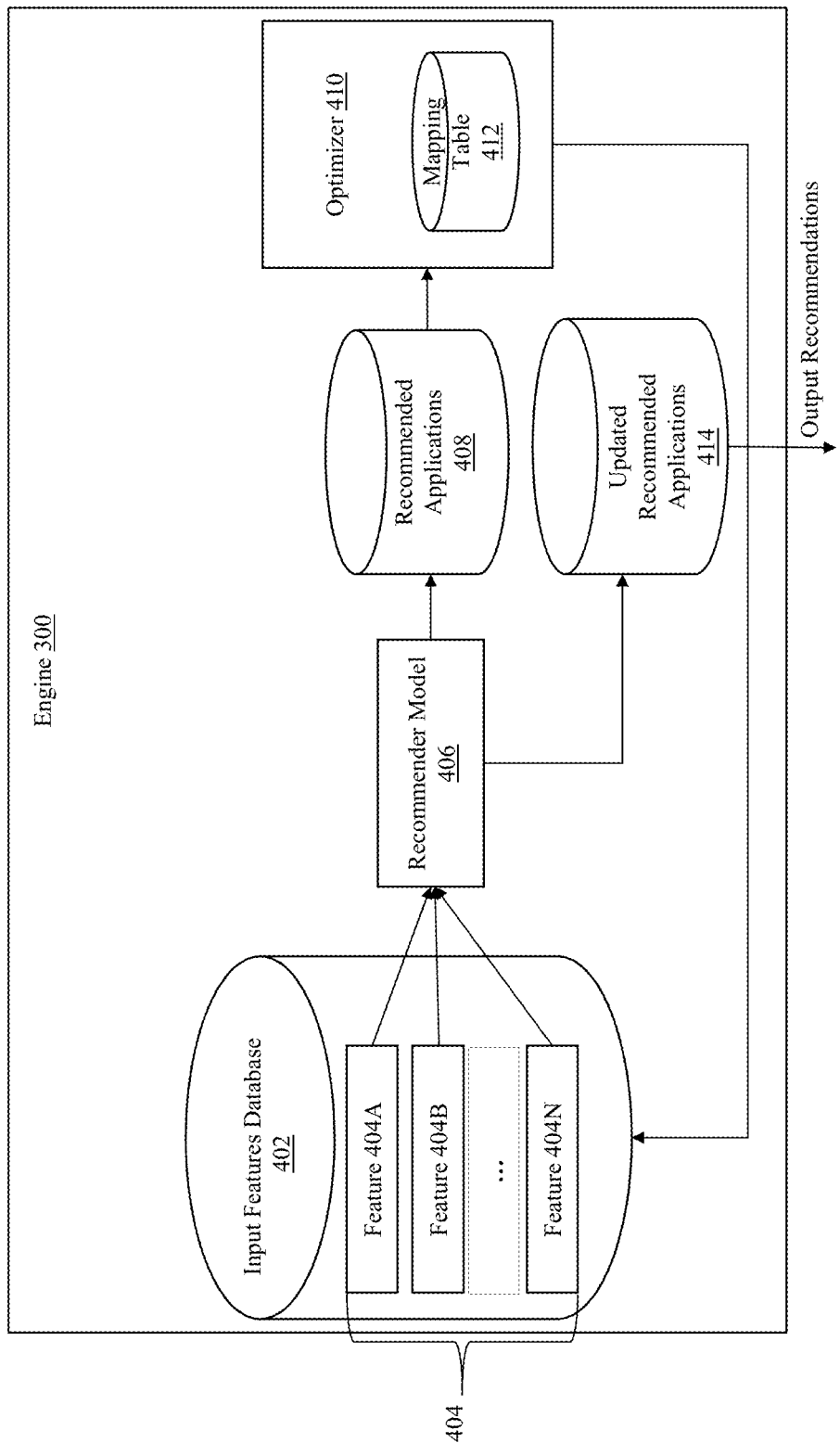
FIG. 4 is one example of the engine of FIG. 3 for generating recommendations of computer applications to the entity, according to one embodiment.

Generally, the engine 300 is configured to utilize a neural network recommendation model to generate recommendations and an optimizer to dynamically prioritize certain features of the model, conveniently resulting in a more accurate and efficient recommendation system which updates dynamically to the current input features. Referring to FIG. 4, the engine 300 comprises a neural network model, shown as a recommender model 406 for generating recommendations of applications of interest (e.g. recommended applications 408) for an entity based on input entity features 404 via an input features database 402, and an optimizer 410 that is configured to learn from the output recommendations of the neural network model such as to derive at least one or more traits of interest, and emphasize a particular trait to be emphasized in subsequent executions of the neural network to generate updated recommended applications 414.

Each of the recommender model 406 and the optimizer 410 may be implemented in software and may include instructions, logic rules, machine learning, artificial intelligence or combinations thereof stored on a memory (e.g. stored within data 134 on the e-commerce platform 100 or an external memory accessible by the engine 300) and executed by one or more processors which, as noted above, may be part of or external to the platform 100 to provide the functionality described herein.

Although the engine 300 is illustrated as a distinct component of the e-commerce platform 100 in FIG. 3, this is only an example. The engine could also or instead be provided by another component residing within or external to the e-commerce platform 100. In some embodiments, either or both of the applications 142A-B provide an engine that implements the functionality described herein to make it available to customers and/or to merchants. Furthermore, in some embodiments, the commerce management engine 136 provides that engine. However, the location of the engine 300 is implementation specific. In some implementations, the engine 300 is provided at least in part by an e-commerce platform, either as a core function of the e-commerce platform or as an application or service supported by or communicating with the e-commerce platform. Alternatively, the engine 300 may be implemented as a stand-alone service to clients such as a customer device 150 or a merchant device 102. In addition, at least a portion of such an engine could be implemented in the merchant device 102 and/or in the customer device 150. For example, the customer device 150 could store and run an engine locally as a software application.

As discussed in further detail below, the engine 300 could implement at least some of the functionality described herein. Although the embodiments described below may be implemented in association with an e-commerce platform, such as (but not limited to) the e-commerce platform 100, the embodiments described below are not limited to e-commerce platforms and may be implemented in other computing devices for generating recommendations of computer applications of interest to entity computing devices.

Recommender Model

Referring to FIG. 3, the engine 300 accesses a database of input features, shown as input features database 402 which may store a plurality of features 404 (shown individually as feature 404A, feature 404B, . . . feature 404N) associated with a given entity (e.g. an online client accessing the system via customer device 150 or online merchant accessing via merchant device 102). The features 404 may characterize various attributes of an entity such as but not limited to: category of applications used; online behaviour of user (e.g. merchant or buyer); current functionality of applications used; geographical area or jurisdiction of entity; tenure of client or merchant interacting with platform 100; customer or merchant characteristics; product or service categories of interest to the entity; product or services sold by the merchant or acquired by the client; industry of merchant or client; features of current applications used by the entity; brands of products available for purchase; quantity of products or services purchased or offered; number of orders placed in a defined time period, Gross Merchandise Value (GMV) measuring total volume of sales; types and number of fulfillment methods used by an online merchant in a defined period, etc.

The category of applications used by an entity may indicate a type of application, e.g. productivity, gaming, accounting, music/video streaming, news feed, social media, purchasing, shipping, etc. It will be appreciated that the taxonomy of categories applicable to a platform may vary from implementation to implementation as they range of potential applications and their functionality may vary based on the type of application store being offered. The characteristics of applications used may include, assuming an example category of purchasing, "one-click check-out", "credit card processing", "refund payments", "store credits processing", "gift card payments" or the like. The feature of geographical area may refer, for example, to the geographical area in which the merchant operates, the geographical area in which purchasers reside, or the geographical area or jurisdiction to which the application specifically relates, such as a specific country, state or municipality. The characterizing features of an application used in the features 404 may further refer to some feature or functionality desired in the application, such as, for example, touchscreen capability, compatibility with a certain plug-in, compatibility with a certain operating system, availability of certain languages, character sets, fonts, or other graphical user interface features, and any other such feature.

Referring again to FIG. 4, the engine 300 accesses an input features database 402 and utilizes a set of known input features 404 associated with a given entity (e.g. an online user utilizing a computer device and interacting with the platform 100). These features 404 are input into a recommender model 406. The recommender model 406 is a neural network model configured to process the features 402 and related metadata to generate a first set of recommendations of applications of interest, shown as recommended applications 408, based on behavioral patterns derived from the input features 404.

The neural network model may be selected from: auto-encoders, convolutional neural networks (CNN), recurrent neural networks (RNN), and other recommendation models as may be envisaged.

Characteristics of an entity provided in the input features data 404 may additionally or alternatively include customer information, sale information, shop creation information, website information, currency information, credit card provider information, merchant name, merchant deal types, brand name, merchant deal type, sale values, shop status, payment information, social media information, account information, etc.

In some implementations, the recommender model 406 may be trained using known historical input data (e.g. features for other entities) and output data (e.g. applications of interest) in order to build the recommender model 406. After analyzing a predefined number of examples of input features 404 and recommended applications 408, the machine learning model creates the recommender model 406 and includes information about the algorithmic formula for producing an output based on patterns from previous input-output examples used to train the model. Once trained, the recommender model 406 may then be applied to new input features 404 for other entities to generate the recommended applications 408. The recommended applications 408 may be stored on a database or memory directly on the engine 300 or in a memory of the e-commerce platform 100 such as data 134 or in an external database. Thus, the recommender model 406 utilizes a machine learning model to determine from the input features 404 (e.g. based on historical feature data for the given entity and other entities considered similar to the entity and other applications that were of interest to other similar entities) the set of recommendations of computer applications 408.

By way of another example, metadata information relating to the downloading, usage and rating of one or more applications by a user as relevant to the platform 100 (e.g. a user associated with a merchant device 102 and/or customer device 150) may be collected and processed by the engine 300 as the input features 404. Additionally, as discussed with reference to FIG. 6, feedback on how a recommended fares in terms of engagement from a user may be received back from a computing device associated with an entity and such feedback applied to the input features 404. Such features 404 may be applied to a recommender model 406 to generate a list of potential computer applications that the user may similarly be interested in (e.g. via links to download the applications from an app store). In at least some examples, the recommendations generated may take into account various features of the applications that were previously processed or recommended by the recommender model 406 such as the purchase price of the applications, their functionalities, their developers, their regional availability, etc. In some aspects, the recommender model 406 is configured to identify features 404 of other available applications or resources which are similar to the currently used applications by an entity and make similar recommendations of computer applications for the entity that are likely to be of interest to the user. In some cases, the recommender model 406 further instructs the computing device associated with the entity (e.g. user computing device 602 shown in FIG. 6) for which recommendations are being made to download the recommended applications 408 thereon automatically for subsequent engagement and execution.

In at least some aspects, the output of the recommender model 406 may relate in some way to patterns derived from the input features 404. That is, the recommender model 406 may be configured to generate recommended applications 408 (or specific categories of applications) based on commonalities, events, patterns or occurrences derived from the input features that are specifically relevant in the context of making application recommendations that would be of interest. For example, the recommender model 406 may recommend or prioritize "order management" applications in response to one or more of: a number of orders in the past week, a weekly GMV, a number of fulfillment methods used in the past week, etc.

Optimization of Recommended Applications

As noted above, the engine 300 is configured to dynamically optimize the recommendations in order to generate new and/or updated recommendations that have features which are based on derived knowledge from prior recommendations generated for the entity. As shown in FIG. 4, an optimizer 410 receives the recommended applications 408 and is configured to derive patterns and associated characteristics from the output of the recommender model 406 and based on these patterns determine which of the input features 404 to emphasize in a subsequent execution of the model order to generate more accurate and relevant recommendations in a subsequent output as updated recommended applications 414. Additional aspects of operating the optimizer 410 and the recommender model 406 are further described with relation to the operations in FIG. 7.

Referring again to FIG. 4, in order to determine which applications are likely to be of greatest interest to the user, a second model, shown as the optimizer 410 is used to automatically predict the likely characteristics and preferences of the entity based on common features that exist in a prior set of recommendations (e.g. recommended applications 408). In one example, this may be done by clustering a first set of recommendations (e.g. recommended applications 408) and the associated traits of the recommended applications (e.g. purpose of application; category of application; cost of application; ease of accessibility; compatible devices, etc.) to determine a common set of traits in at least a top set of the recommended applications 408. The optimizer 410 may then retrieve associated characteristics and preferences for the set of common traits such as to automatically prioritize them. For example, the optimizer 410 may determine that the top 5 applications recommended are order management application software from a particular company. Based on this, the optimizer 410 may access a mapping table 412 database of labelled common application traits to input feature characteristics or metadata. The mapping table 412 may indicate for example, that certain application traits are linked to (e.g. directly or indirectly contribute to) certain categories or characteristics of input features, referred to as priority characteristics and preferences for the features 404. In the current example, the optimizer 410 may determine that based on the order management applications recommended, input features 404 related to order activity (e.g. a number of orders in the past week, and GMV) should be prioritized. As such, the prioritization of input features 404 having certain characteristics and/or preferences is likely to reflect the most important drivers in determining how receptive an entity will be to one or more recommendations of the computer applications 408 of the nature generated by the recommender model 406.

Figure 7:
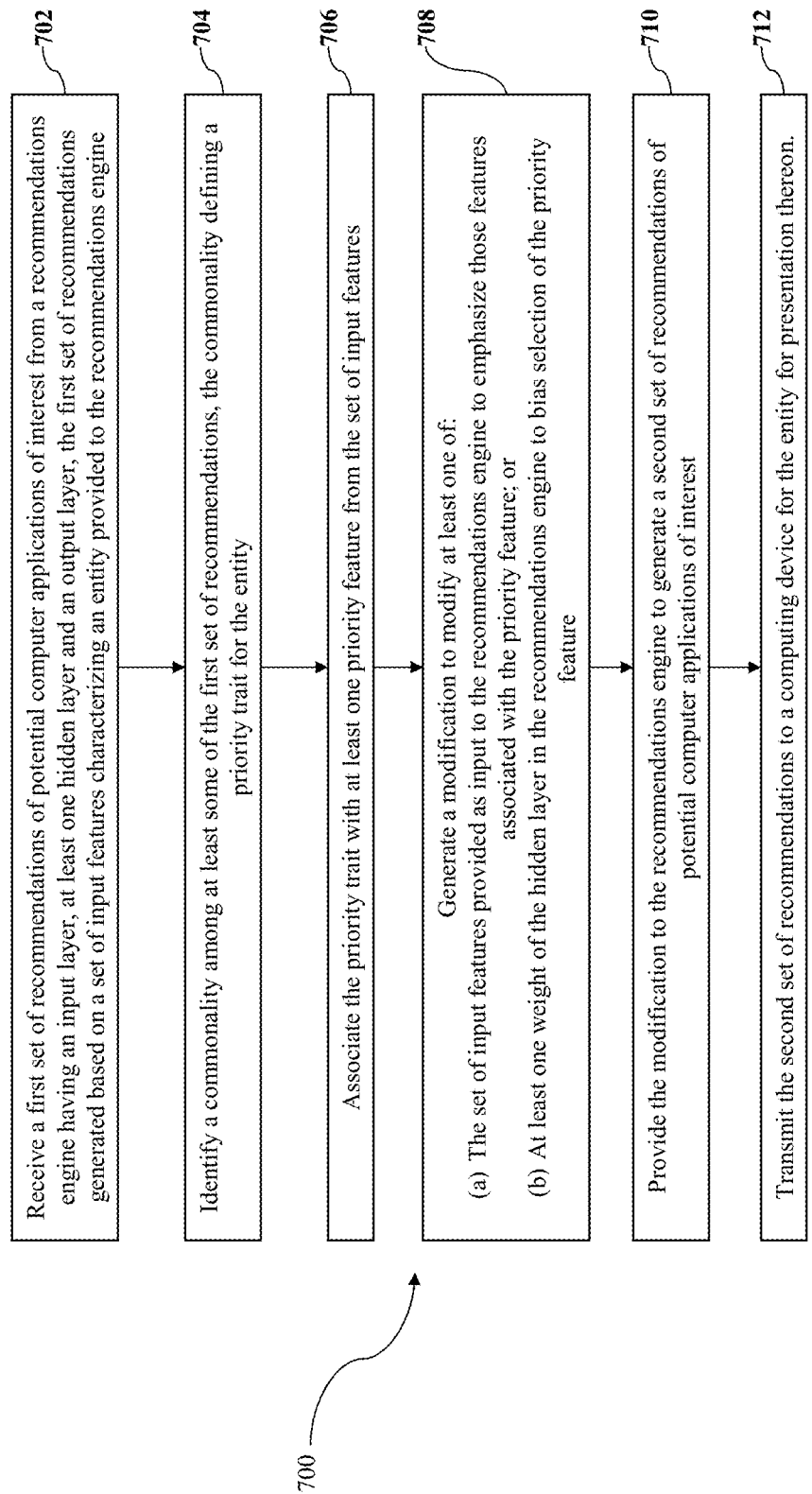

Alternative ways of determining the commonality of traits in the recommended applications 408 by the optimizer 410 such as performing a similarity measure between the recommendations using a k-nearest neighbour classification to determine similar traits in the output recommendations is further discussed in relation to FIG. 7.

The input features database 402, the recommended applications 408 database, the updated recommended applications 414 database and the mapping table 412 may each include a plurality of databases, some of which may be provided within the e-commerce platform 100 and some of which may be hosted external to the e-commerce platform 100.

Once identified and prioritized, in one aspect, the optimizer 410 is configured to cause the input features 404 to the recommender model 406 to be recalculated such that select features corresponding to or having the priority characteristics and preferences are emphasized (i.e. weighted more heavily). For example, from the features 404, it may be determined that a particular feature 404N contains the priority characteristics and preferences that is linked to the common trait in the recommended applications 408, thereby designated as the prioritized or emphasized feature (e.g. feature 404N). Thus, in one example, the prioritized feature 404N is emphasized, such as by applying a scalar multiple to that feature.

In some cases the optimizer 410 determines that based on the priority traits of the recommended applications 408 output from the recommender model 406, more than one input feature 404 (e.g. feature 404A and feature 404N) of the model may need to be emphasized as contributing to or related to the identified priority trait. In such a case the optimizer may apply a scalar multiple to increase the weighting of the identified features or otherwise modifying the weighting applied in the recommender model 406 to emphasize the identified features (e.g. feature 404A and 404N).

Notably, the modified input features 404, including the higher weighted prioritized features (e.g. feature 404A and 404N), are inputted into the original recommender model 406 which generates a second set of recommendations of computer applications, shown as updated recommended applications 414 for subsequent download or access by the entity. Since the modified input features 404 are emphasized for features associated with the priority characteristics and preferences (e.g. priority feature 404N), the second set of recommendations (e.g. updated recommended application 414) will be different from the first set of recommendations 408 in that it will be more selective for and tailored to the preferences of the entity. The updated recommended applications 414 may also reveal hidden recommendations or re-prioritize recommendations formerly ignored.

As an example, the top recommended applications from the first set of recommendations, shown as recommended applications 408, may have a high overall recommendation score or confidence score for apps that are free followed by apps that track fitness having the next highest score rating. The priority feature preferences and characteristics derived from an analysis of the traits in the first set of recommendations by the optimizer 410 in this case may be first "low budget" and then "health". By re-calculating the input features 404 of the recommender model 406 to emphasize the features related to cheap apps on a second iteration of the model and apps in the health category on a third iteration of the model, the re-running of the modified input features in the recommender model 406 will yield output recommendations that are more selective for computer apps with one or more of these features. Conveniently, more effective and accurate recommendations of computer applications may be delivered to the device for the entity and therefore more likely to serve as better recommendations for the entity, which are likely to be interacted with by the user of the entity. Additional aspects of determining the updated recommended applications 414 are discussed with reference to FIG. 7.

Although the above scenario has shown emphasizing features related to one identified key trait in the recommended applications at a time, in some aspects, the optimizer 410 may be configured to emphasize more than one trait from the recommended applications 408 and thus determine the priority input features 404 related to the multiple traits. In such a scenario, more than one trait is emphasized leading to multiple related features being emphasized for the recommender model 406. For example, in one case where the output recommendations 408 relate to digital movies, the engine 300 may determine that because the priority traits indicate that a user likes Superhero movies with strong female leads as determined from the output recommendations of the recommender model 406, then features related to both of these linked traits should be emphasized by the model 406.

In an alternative embodiment, the optimizer 410, rather than instructing modifications to the input features 404, may instruct that one or more features corresponding to the identified set of priority characteristics and preferences are emphasized in the recommender model 406 such that the model 406 positively selects for or biases toward recommendations with features that are associated with those priorities. That is, the optimizer 410 may instruct that parameters of the recommender model 406 may be modified to bias toward the priority characteristics and preferences of the identified features.

Figure 5:
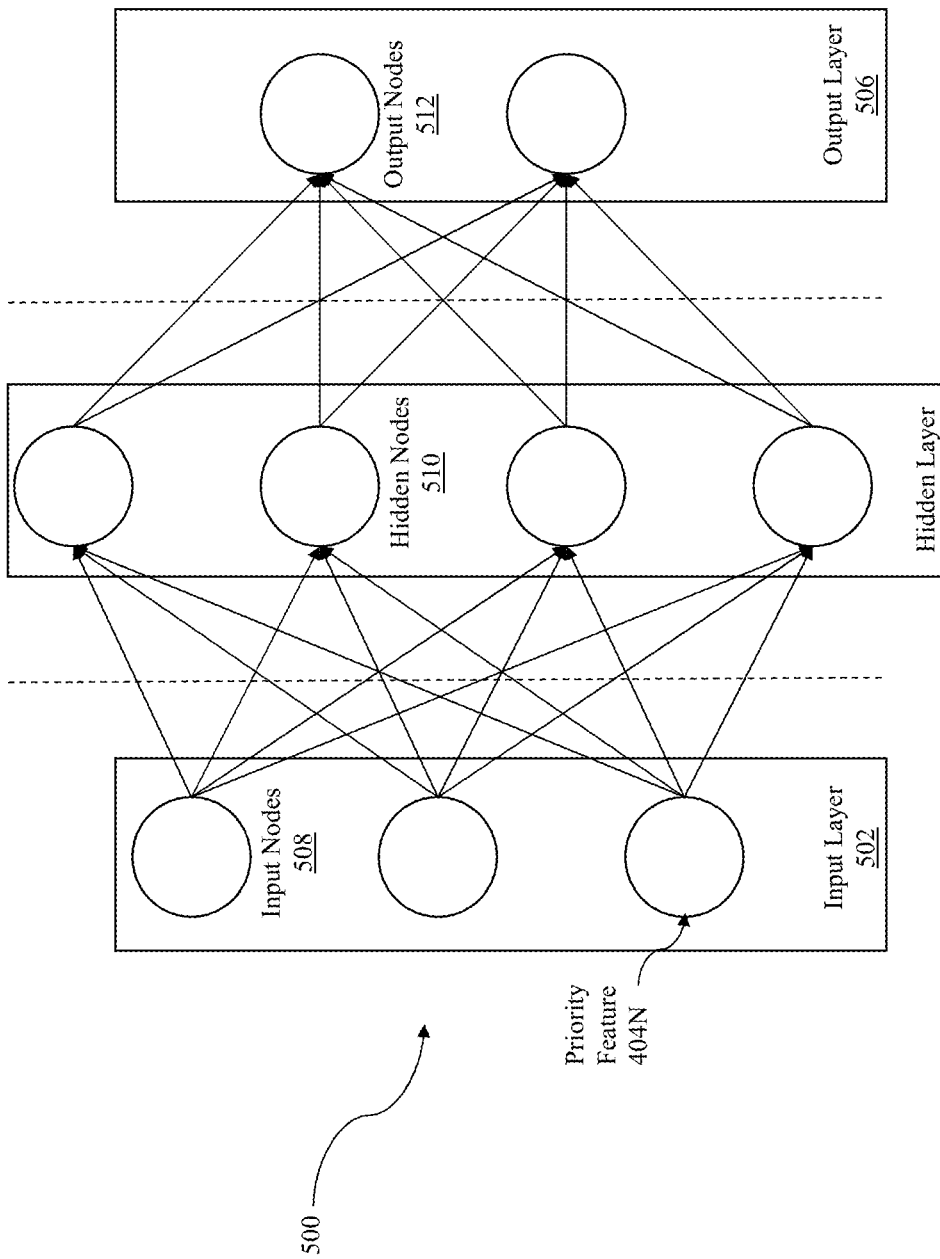
FIG. 5 is an example of a neural network model used for a recommender model of FIG. 4 for generating recommendations of applications of interest, according to one embodiment.

Such model modifications to emphasize one or more features, may occur for example by way of modifying weights of nodes in one of the layers of the neural network model between the input layer and the output layer, such as an input layer 502 and/or a hidden layer 504 shown in FIG. 5 to bias the selection of the emphasized feature(s).

Referring to FIG. 5, shown is an example neural network model 500 for implementing the recommender model 406 of FIG. 4. Neural networks typically include a large number of interconnected nodes. The neural network model 500 may be divided into an input layer 502, a hidden layer 504, and an output layer 506. Data from the input features database 402 including the features 404 and associated metadata in FIG. 4 are received by the input layer 502 having input nodes 508, where the features relevant to the model are detected. The one or more hidden layers 504 having hidden nodes 510 are configured to analyze and process the input features 404 at each of the layers and then the final result is provided as the output layer 506 having output nodes 512 providing the application recommendations. Specifically, the connections between the nodes are characterized by associated weights. The weight is a parameter in the neural network that transforms the input data within the network's hidden layers. Each node in a given layer receives a set of inputs, multiplied by a weight value defined for the node and the resulting output is either observed or passed to the next layer in the neural network based on a function of the node (e.g. a sigmoid function). Typically, the weight affects the amount of influence a change in the input will have upon the output. A low weight value may have no change on the output of the model, and alternatively a larger weight value will have a more significant effect on the output. For example, a single node in the hidden nodes 510 may take the input data from each of the input nodes 508 and multiply it by an assigned weight value, then add a bias before passing the data to the next layer. The final output layer 506 consists of a number of discrete outcomes. In at least some embodiments, each of the output nodes 512 may correspond to a particular application recommendation (e.g. recommended applications 408 or updated recommended applications 414).

Thus, put generally, a weight represents a strength of the edges or connection between nodes in different layers. If the weight from a first node in an input layer 502 (e.g. neuron 1) to a second node in a hidden layer 504 (e.g. neuron 2) has greater magnitude, it means that neuron 1 has a greater influence over neuron 2.

Referring again to the communication between the recommender model 406 and the optimizer 410 of FIG. 4 in the context of the neural network model of FIG. 5, once the recommendations are generated by the recommender model 406 as output recommended applications 408, the optimizer 410 determines a commonality between the recommendations, preferably those ranked in a defined top set of recommendations (e.g. top 5 recommended apps). The commonality may indicate that the recommendations share a particular trait. The mapping table 412 may be applied or other contribution modelling techniques to determine one or more priority characteristics of features associated with or that contribute to the trait and thus identify one or more input features 404 (e.g. priority feature 404N) having the priority characteristics which need to be emphasized. Once the priority feature 404N is identified, the optimizer 410 may instruct to either (1) modify the input features, e.g. the priority feature 404N, before feeding into model 406, or (2) modify optimal weights of a first layer of the model (e.g. a first hidden layer 504).

Specifically, in the first case of modifying the priority feature 404N, a scalar multiple—such as to multiply by a factor of 2—is applied to priority feature 404N at the input layer 502 when the priority feature 404N is one of the input nodes 508.

In the second case of modifying the model, each of the nodes in the hidden layer 504 is configured to apply a weight, e.g. a scalar multiple of 2, to input received from the priority feature 404N from the input layer 502. Thus, when a signal or value arrives from the priority feature 404N at each of the hidden nodes 510, it gets multiplied by a weight value which is adjusted to increase the weight value in the case of emphasized features. As mentioned herein, the weight decides how much influence the input features will have on the output. Thereby by adjusting the weight of the priority features either at the input layer or at a hidden layer, the influence of the priority features on the output in the output layer 506 is increased.

The modified recommender model 406 re-runs the original input features and generates a second set of recommendations, shown as updated recommended applications 414. Since the modified recommender model 406 is biased for features associated with the priority characteristics and preferences, again, the second set of recommendations will be different from the first set of recommendations in that it will likely be more selective for and tailored to the preferences of the entity.

In the above example, the biased selection for priority characteristics performed by the engine 300—e.g. cheap/free application and/or applications in the health category in the recommender model 406 will yield output recommendations, e.g. updated recommended applications 414, that are more selective for applications with one or more of these prioritized traits and therefore more likely to serve as better and more accurate recommendations for the entity.

Conveniently, the engine 300 allows a recommendation that may not be highly recommended using conventional recommender models (i.e. ranked as item #10 out of 20 in the first set of recommendations) but would otherwise serve as an ideal recommendation for the entity to be selected and ranked higher (i.e. 1 out of 20 in the second set of recommendations). This may be achieved, via the optimizer 410 by instructing emphasizing the priority input features 404 found in that recommendation that are associated with characteristics and preferences that are important to the entity. As noted above, emphasizing the priority features that are shown to contribute to the recommendation or category of recommendations of interest, may include either directly modifying the weighting of the priority features input to the recommender model 406 and/or modifying weightings in one or more layers of the neural network model of the recommender model 406 (e.g. modifying weights in the input layer 502 or the hidden layer 504 of the example neural network model 500) to emphasize such priority features and bias the selection thereof by the model.

Figure 6:
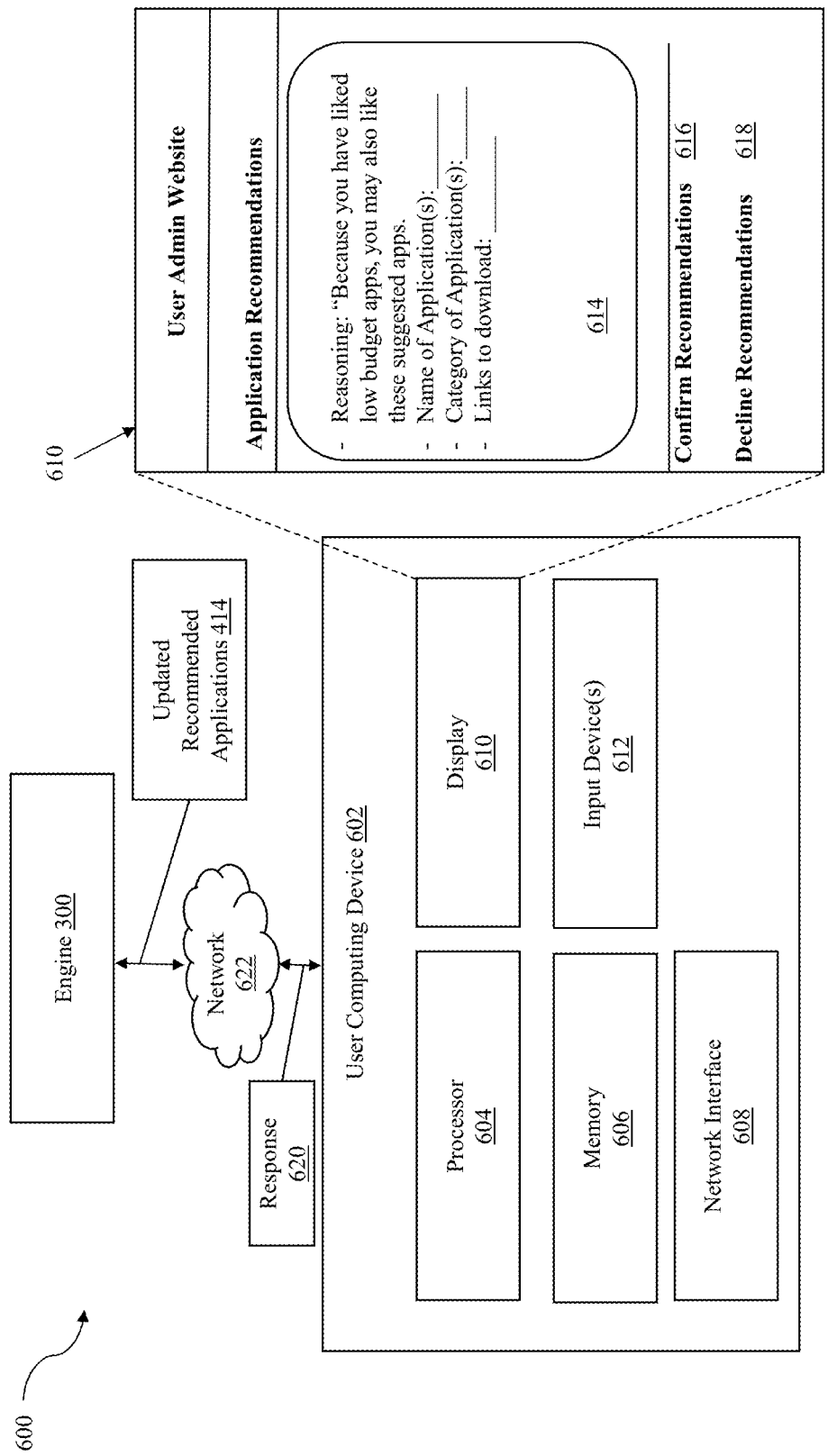
FIG. 6 is a block diagram of a computer network for providing trait based application recommendations to at least one computing device, according to one embodiment; and, FIG. 7 shows an example flowchart of a method for dynamically generating recommendations of computer applications of interest to an entity, based on determining and emphasizing features and characteristics for the entity, according to one embodiment.

Referring to FIG. 6, shown is a computing system 600 for providing application recommendations to an entity from the recommendations system and engine 300 of FIG. 4 to associated user computing device(s) 602, in accordance with trait focused recommendations as disclosed herein.

As illustrated in FIG. 6, the engine 300, as part of the e-commerce platform 100, may be configured to communicate with one or more other computing devices, including a user computing device 602 across a communication network 622. The user computing device 602 comprises a processor 604 and a memory 606 storing instructions for execution by the processor to implement the functionality of the user computing device 602 described herein. Additionally, the user computing device 602 comprises a communication device, such as a network interface 608 for communicating with other computing devices across the communication network 622. The user computing device 602 further comprises a display 610 for displaying the initial and any subsequent application recommendations 408 and 414 and any associated metadata received from the engine 300. The user computing device 602 further comprises an input device 612 for receiving and processing inputs received on the display 610 in response to the recommendations displayed such as by way of selecting the confirming recommendations 616 or declining recommendations 618 as shown in FIG. 6.

Referring to FIGS. 4 and 6, once the second set of recommendations of computer applications, shown as the updated recommended applications 414, suitable for the entity is generated, the engine 300 may send instructions to a user computing device associated with the entity, shown as the user computing device 602, to present the recommendations thereon. In turn, the user computing device 602 may display in a first view portion 614 on a user interface of a display 610, the updated recommended applications 414, in association with the priority characteristics and preferences that gave rise to that selection. For example, the first view portion 614 may display a reasoning for the updated recommendations such as: "Because you like low budget apps, you might also like the following ten apps" or "Because you live in Canada, we believe you might also enjoy these popular apps for Canadians". By additionally presenting the traits in prior recommendations and/or related input features that resulted in a modified set of recommendations, the entity is also more likely to interact with the modified recommendations. Additionally, the display 610 may provide options for accepting or declining the recommendations such as a confirm recommendations 616, and a decline recommendations 618. Such response may further be communicated via the network interface 608 as a response 620 back to the engine 300 and may further be used as additional characteristics for the entity as defined in one or more of the input features 404. For example, one of the features 404 may relate to user feedback on prior recommendations. Such feature may indicate that a user was shown the following particular recommendations which were well received by the user and thus the recommender model 406 may take this additional input feature indicating feedback of prior recommendations into consideration for subsequent recommendations.

In some examples and referring to FIGS. 4 and 6, the second set of recommendations, shown as the updated recommended applications 414 once generated are automatically downloaded (e.g. from the app store) onto to the device associated with the entity, shown as the user computing device 602 for immediate interaction to allow efficient use of the recommendations.

FIG. 7 is a flowchart of operations 700 which may be performed by the recommendations engine 300 of FIG. 4 on a computing device, such as the e-commerce platform 100 or on another computing device such as the merchant devices 102 or user computing device 602. The operations 700 are further described below with reference to FIGS. 1-6. The computing device may comprise a processor configured to communicate with a display to provide a graphical user interface (GUI) where the computing device has a network interface to receive various features of entities including for example, application behaviour information, application interactions and preferences and wherein instructions (stored in a non-transient storage device), when executed by the processor, configure the computing device to perform operations such as operations 700. In general, the description below will refer to the method of operations 700 being carried out by a processor.

The operations 700 select and generate recommendations of relevant computer applications for an entity based on determining similarities in the recommendations and deriving traits of importance in the recommendations. The operations utilize a neural network recommendation model and upon detecting the traits, determine one or more priority features from the input features to the model that contribute to the traits and should thus be emphasized, either directly by changing the weighting applied to the priority features or by modifying the model to further emphasize the priority features. The recommendations may then be displayed on a user interface of a computer associated with the entity (e.g. an online merchant).

In operation 702, the processor receives a first set of recommendations of potential computer applications of interest from a recommendations engine (e.g. recommender model 406 of FIG. 4, or neural network model 500 of FIG. 5). The first set of recommendations are generated via a set of known input features characterizing the entity for which recommendations are needed and the features provided to a recommender machine learning model, e.g. the recommender model 406 provided by the recommendations engine 300. The recommender model 406 has an input layer, at least one hidden layer and an output layer. An example of such a neural network model 500 is provided in FIG. 5, having the input layer 502, hidden layer 504 and output layer 506. As shown in FIG. 4, such recommendations may be provided to an optimizer 410 for subsequent analysis.

Following the operation 702, an operation 704 is next. In operation 704, the processor identifies at least one commonality among at least some recommendations of the first set of recommendations, the commonality defining a priority trait for the entity. For example, the processor (e.g. the optimizer 410) may examine the top 5 recommendations of recommended output applications 408 and determine that these recommended applications all relate to marketing applications.

In at least some aspects, the operation 704 of the processor (e.g. provided by the recommendation engine 300) determining a trait to prioritize in the first set of recommendations as output by the recommender model 406, comprises the processor running a second model (e.g. provided by the optimizer 410), such a second machine learning model, to analyze the first set of recommendations. The analysis includes the processor identifying and prioritizing a set of traits in the recommendations, including a set of priority characteristics and preferences among the top set of recommendations. Thus, for example, the optimizer 410 may include a similarity machine learning model which uses a nearest neighbour approach, such as k-nearest neighbour (k-NN) to identify the similarity between two or more objects, namely the recommendations, based on algorithmic distance functions. The k-NN classifies new data points based on their position to nearby data points, thereby being useful in similarity machine learning. The similarities between the recommendations (e.g. recommended applications 408) once identified may be applied to operation 706.

In at least some aspects, the operation 704 of the processor identifying a commonality includes applying a clustering model (e.g. via the optimizer 410) to the first set of recommendations to automatically group together data points of recommendations (e.g. recommended application 408) with similar characteristics (e.g. similar country, language, application type or category, etc.) and assigning the clustered recommendations to clusters defining categories of recommendations. Thus, the recommended applications 408 being similar to one another may be clustered together by the processor such as to then analyze the clustered applications and determine which characteristics link them together such as to label these as the priority traits. Once the priority traits are identified, they may then be applied to the operation 706.

In at least some aspects, the operation 704 of the processor of using at least some of the first set of recommendations for identifying a commonality, includes choosing a defined set of the recommendations having the highest degree of certainty in the recommendations for the entity. For example, this may include the recommender model 406 indicating that a top subset of the recommendations has a confidence score higher than a defined value and thus only those recommendations may be used by the optimizer 410 in order to determine the commonality in the recommendations for subsequent analysis in operation 706.

Following the operation 704, an operation 706 is next. At the operation 706, the processor is configured to associate the priority trait, derived based on determining one or more similar characteristics in the first set of recommendations, with at least one priority feature from the set of input features. In the above example, the processor being provided by the optimizer 410 may map the priority trait to labelled characteristics of features satisfying such a trait via the mapping table 412. For example, the mapping may reveal that the priority trait of marketing applications is linked to features indicating recent marketing activity, such as a marketing campaign. Based on this, the processor (e.g. as provided by the optimizer 410) may then identify the priority input features of interest (e.g. as selected from the input features 404) for the recommender model which generated the recommendations (e.g. the recommender model 406).

In at least some aspects of operation 706, the processor associating the priority trait with at least one priority feature from the set of input features includes the processor (e.g. optimizer 410) analyzing the set of input features to the recommender model 406 to identify features which highly contribute to particular recommendations provided by the recommendations engine and associated with the commonality. Thus, once the commonality is determined in operation 704, the optimizer 410, may determine which of the input features had the greatest contribution to the recommendations having the commonality using a feature contribution analysis applied by the processor. The processor may perform feature importance calculation to evaluate the recommender model 406 by assigning scores to input features to the predictive recommender model 406 that indicates the relative importance of each input feature when making a prediction but specifically to importance of features that contributed to the recommendations with the commonality.

Following the operation 706, an operation 708 is next. In operation 708, upon identifying the priority feature, the processor may then generate a modification, which in a first case, modifies the set of input features provided to the recommendations engine (e.g. the recommender model 406) to only emphasize those associated with the priority feature. For example, if feature 404N is the priority feature, then this feature may have a scalar multiple of 2 applied to it as input to the recommender model 406 on a subsequent run of the model.

Alternatively, in operation 708, upon identifying the priority feature, the processor may in a second scenario, generate a modification to modify at least one weight of the hidden layer in the recommendations engine to bias selection of the priority feature. For example, referring to FIG. 5, the processor may modify the weighting applied by each of the hidden nodes 510 to the priority feature 404N such as to bias selection of such a priority feature to the output layer 506.

Following the operation 708, in operation 710, the processor may provide the modification to the recommendations engine to generate a second set of recommendations of potential computer applications of interest. As noted above, the modification(s) may be defined by one or more of the steps in operation 708. For example, referring to FIGS. 4 and 5, this may include the optimizer 410 indicating the priority feature 404N to emphasize and cause re-running of the recommender model based on the modification in operation 708 to the weighting of the input features or to the model 406 to generate an updated recommended application 414.

In some additional aspects of operation 710, the processor may further be configured to iteratively instruct re-running the recommendations engine, and specifically, the recommender model 406 a plurality of times to generate a different set of recommended applications each time for analysis by the optimizer 410. Each of the times the recommender model 406 is re-run is to emphasize another commonality and a respective set of commonality combinations identified in an output set of recommendations and associated input feature to the recommendations engine (e.g. the recommender model 406) on a prior execution of the recommendations engine. In this way, the recommendations engine 300 may iteratively emphasize different input features to the recommender model 406 and reveal in its updated recommended applications 414 the reasoning (e.g. the other commonality or commonality combinations leading to the recommendations).

Following the operation 710, in operation 712, the processor may then output and transmit the second set of recommendations (e.g. the updated recommended applications 414) to a computing device for the entity for presentation thereon. In some aspects of operation 712, the processor instructing the presenting of the second set of recommendations further comprises associating the second set of recommendations (e.g. the updated recommended applications 414) with the priority trait common to the at least some of the first set of recommendations and transmitting the second set of recommendations comprises providing an instruction to the computing device for the entity (e.g. user computing device 602) to further display a reasoning for the second set of recommendations based on the association. For example, referring to FIG. 6, such a display of the application recommendations, and additional display of example reasoning for such recommendations is shown on the user computing device 602 for the display 610 in FIG. 6 (e.g. see the first view portion 614). In some aspects, the processor may further receive feedback from the computing device (e.g. via an input on the display such as the confirm recommendations 616 or decline recommendations 618 which generate the response 620). The response 620 may then be processed by the engine 300 such as to feedback to the features 404 for further updating the output recommendations from the recommender model 406.

In some optional aspects of operation 712, the processor is further configured to instruct the computing device receiving the recommendations for presentation (e.g. user computing device 602) to automatically download the computer applications associated with the second set of recommendations (e.g. updated recommended applications 414) onto the computing device for the entity for subsequent execution upon selection. That is the display 610 shown in FIG. 6 may additionally indicate that the application recommendations have been downloaded onto the user computing device 602 as instructed by the engine 300.

In one or more examples, the functions described may be implemented in hardware, software, firmware, or combinations thereof. If implemented in software, the functions may be stored on or transmitted over, as one or more instructions or code, a computer-readable medium and executed by a hardware-based processing unit.

Computer-readable media may include computer-readable storage media, which corresponds to a tangible medium such as data storage media, or communication media including such media as may facilitate transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be available media that can be accessed by one or more computers or one or more processors to retrieve instructions, code and/or data structures for implementation of the techniques described in this disclosure. A computer program product may include a computer-readable medium. By way of example, and not limitation, such computer-readable storage media can comprise RAM, ROM, EEPROM, optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using wired or wireless technologies, such are included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more general purpose microprocessors, application specific integrated circuits (ASICs), field programmable logic arrays (FPGAs), digital signal processors (DSPs), or other similar integrated or discrete logic circuitry. The term "processor," as used herein may refer to any of the foregoing examples or any other suitable structure to implement the described techniques. In addition, in some aspects, the functionality described may be provided within dedicated software modules and/or hardware. Also, the techniques could be fully implemented in one or more circuits or logic elements. The techniques of this disclosure may be implemented in a wide variety of devices or apparatuses, an integrated circuit (IC) or a set of ICs (e.g., a chip set).

Furthermore, the elements depicted in the flowchart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it may be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

Various embodiments have been described. These and other embodiments are within the scope of the following claims.

The invention claimed is:

1. A computer-implemented method for dynamically generating recommendations of computer applications, the method comprising:
receiving a first set of recommendations of potential computer applications of interest from a recommendations engine having a neural network input layer, at least one neural network hidden layer and a neural network output layer, wherein the recommendations engine includes a plurality of interconnected nodes divided among the layers, the first set of recommendations generated based on a set of input features characterizing an entity provided to the recommendations engine;
identifying a commonality among at least some recommendations of the first set of recommendations, the commonality defining a priority trait for the entity;
associating the priority trait with at least one priority feature from the set of input features;
generating a modification, the modification modifying at least one of:
the set of input features at one or more input nodes of the plurality of interconnected nodes provided as input to the recommendations engine so as to emphasize those features associated with the priority feature, the one or more input nodes being neural network nodes of the neural network input layer, or
at least one weight of one or more hidden nodes of the plurality of interconnected nodes in the recommendations engine to bias selection of the priority feature, the one or more hidden nodes being neural network nodes of the at least one neural network hidden layer;
providing the modification to the recommendations engine to generate a second set of recommendations of potential computer applications of interest; and,
transmitting the second set of recommendations to a computing device for the entity for presentation thereon.

2. The method of claim 1, wherein the modification modifies the set of input features provided as input to the recommendations engine to emphasize those features associated with the priority feature, and wherein the priority feature being emphasized comprises weighting each priority feature more heavily than other features in the set of input features as input to the recommendations engine so as to bias the recommendations engine towards the priority feature.

3. The method of claim 2, wherein the priority feature being emphasized further comprises: applying a scalar multiple to the priority feature to at least double a weighting of that feature as compared to the other features.

4. The method of claim 1, wherein the modification modifies at least one weight of the at least one neural network hidden layer in the recommendations engine to bias selection of the priority feature, and wherein modifying at least one weight of the one or more hidden nodes of the plurality of interconnected nodes comprises: modifying weights in a first hidden layer at each neural network node receiving the priority feature to bias selecting the priority feature over the other input features.

5. The method of claim 1, wherein the at least some recommendations amongst which the commonality is identified comprise recommendations associated with a higher degree of certainty than other recommendations of the first set of recommendations.

6. The method of claim 1, wherein determining the commonality comprises clustering the first set of recommendations to automatically group together data points with characteristics determined to be similar and assigning each said group to categories of recommendations.

7. The method of claim 1, wherein associating the priority trait with the at least one priority feature from the set of input features comprises analyzing the set of input features to identify features that highly contribute to particular recommendations provided by the recommendations engine and associated with the commonality.

8. The method of claim 1, wherein:
presenting the second set of recommendations comprises associating the second set of recommendations with the priority trait common to the at least some recommendations of the first set of recommendations; and transmitting the second set of recommendations comprises providing an instruction to the computing device for the entity to display a reasoning for the second set of recommendations based on associating.

9. The method of claim 1, wherein the recommendations engine employs a machine learning model.

10. The method of claim 1, wherein presenting the second set of recommendations comprises automatically downloading the computer applications associated with the second set of recommendations onto the computing device for the entity for subsequent execution upon selection.

11. The method of claim 1, further comprising: iteratively instructing re-running the recommendations engine two or more times to generate another set of recommended applications, each of the iterations emphasizing at least one other commonality and a respective set of commonality combinations identified in the first set of recommendations and a corresponding set of input features to the recommendations engine on a prior execution of the recommendations engine.

12. A non-transitory computer readable medium having instructions tangibly stored thereon, wherein the instructions, when executed cause a system to:
receive a first set of recommendations of potential computer applications of interest from a recommendations engine having a neural network input layer, at least one neural network hidden layer and a neural network output layer, wherein the recommendations engine includes a plurality of interconnected nodes divided among the layers, the first set of recommendations generated based on a set of input features characterizing an entity provided to the recommendations engine;
identify a commonality among at least some recommendations of the first set of recommendations, the commonality defining a priority trait for the entity;
associate the priority trait with at least one priority feature from the set of input features;
generate a modification, the modification modifying at least one of:
the set of input features at one or more input nodes of the plurality of interconnected nodes provided as input to the recommendations engine so as to emphasize those features associated with the priority feature, the one or more input nodes being neural network nodes of the neural network input layer, or
at least one weight of one or more hidden nodes of the plurality of interconnected nodes in the recommendations engine to bias selection of the priority feature, the one or more hidden nodes being neural network nodes of the at least one neural network hidden layer;
provide the modification to the recommendations engine to generate a second set of recommendations of potential computer applications of interest; and,
transmit the second set of recommendations to a computing device for the entity for presentation thereon.

13. A computer system for dynamically generating recommendations of computer applications, the computer system comprising:
a processor in communication with a storage, the processor configured to execute instructions stored on the storage to cause the system to:
receive a first set of recommendations of potential computer applications of interest from a recommendations engine having a neural network input layer, at least one neural network hidden layer and a neural network output layer, wherein the recommendations engine includes a plurality of interconnected nodes divided among the layers, the first set of recommendations generated based on a set of input features characterizing an entity provided to the recommendations engine;
identify a commonality among at least some recommendations of the first set of recommendations, the commonality defining a priority trait for the entity;
associate the priority trait with at least one priority feature from the set of input features;
generate a modification, the modification to modify at least one of:
the set of input features at one or more input nodes of the plurality of interconnected nodes provided as input to the recommendations engine so as to emphasize those features associated with the priority feature, the one or more input nodes being neural network nodes of the neural network input layer, or
at least one weight of one or more hidden nodes of the plurality of interconnected nodes in the recommendations engine to bias selection of the priority feature, the one or more hidden nodes being neural network nodes of the at least one neural network hidden layer;
provide the modification to the recommendations engine to generate a second set of recommendations of potential computer applications of interest; and,
transmit the second set of recommendations to a computing device for the entity for presentation thereon.

14. The system of claim 13, wherein the modification modifies the set of input features provided as input to the recommendations engine to emphasize those features associated with the priority feature, and wherein the priority feature being emphasized comprises the instructions causing the system to weigh each priority feature more heavily than other features in the set of input features as input to the recommendations engine so as to bias the recommendations engine towards the priority feature.

15. The system of claim 14, wherein the priority feature being emphasized further comprises the instructions causing the system to: apply a scalar multiple to the priority feature to at least double a weighting of that feature as compared to the other features.

16. The system of claim 13, wherein the modification modifies at least one weight of the at least one neural network hidden layer in the recommendations engine to bias selection of the priority feature, and wherein modifying at least one weight of the one or more hidden nodes of the plurality of interconnected nodes comprises: modifying weights in a first hidden layer at each neural network node receiving the priority feature to bias selecting the priority feature over the other input features.

17. The system of claim 13, wherein the at least some recommendations amongst which the commonality is identified comprise recommendations associated with a higher degree of certainty than other recommendations of the first set of recommendations.

18. The system of claim 13, wherein determining the commonality comprises clustering the first set of recommendations to automatically group together data points with characteristics determined to be similar and assigning each said group to categories of recommendations.

19. The system of claim 13, wherein associating the priority trait with the at least one priority feature from the set of input features comprises analyzing the set of input features to identify features that highly contribute to particular recommendations provided by the recommendations engine and associated with the commonality.

20. The system of claim 13, wherein presenting the second set of recommendations comprises the instructions causing the system to: automatically download the computer applications associated with the second set of recommendations onto the computing device for the entity for subsequent execution upon selection.

* * * * *